United States Patent [19]

Honda

[11] Patent Number: 5,332,941
[45] Date of Patent: Jul. 26, 1994

[54] ULTRASONIC DRIVING MOTOR

[75] Inventor: Keisuke Honda, Aichi, Japan

[73] Assignee: Honda Electronics Co., Ltd., Aichi, Japan

[21] Appl. No.: 18,879

[22] Filed: Feb. 17, 1993

[30] Foreign Application Priority Data

Feb. 21, 1992 [JP] Japan .................. 4-072569
Feb. 25, 1992 [JP] Japan .................. 4-073601
Feb. 25, 1992 [JP] Japan .................. 4-073602

[51] Int. Cl.5 ............................ H01L 41/08
[52] U.S. Cl. ............................ 310/323
[58] Field of Search .............. 310/323, 369, 328

[56] References Cited

U.S. PATENT DOCUMENTS

| | | | |
|---|---|---|---|
| 4,210,837 | 7/1980 | Vasiliev | 310/323 |
| 4,634,916 | 1/1987 | Okada et al. | 310/323 |
| 4,868,446 | 9/1989 | Kumada | 310/323 |
| 4,884,002 | 11/1989 | Eusemann et al. | 310/323 |
| 4,912,351 | 3/1990 | Takata et al. | 310/323 |
| 4,945,275 | 7/1990 | Honda | 310/323 |

Primary Examiner—Mark J. Budd
Attorney, Agent, or Firm—Burgess, Ryan & Wayne

[57] ABSTRACT

The present invention is directed to an ultrasonic driving member comprising a rotor having slide projections in contact with an edge face of a piezoelectric vibrator.

17 Claims, 12 Drawing Sheets

ULTRASONIC DRIVING MOTOR

BACKGROUND OF THE INVENTION

The present invention relates to an ultrasonic driving motor comprising a rotor having slide projections in contact with an edge face of a piezoelectric vibrator.

The applicant presented a ultrasonic driving motor comprising a piezoelectric vibrator having electrodes divided in two on each side of the vibrator the positions of electrodes on the both sides of the vibrator are shifted slightly in relation to the electrodes on the other side, and when AC power is applied to set of electrodes on both sides of the piezoelectric vibrator, a progressive wave is generated on the edge face and both sides of the piezoelectric vibrator (see U.S. Pat. No. 4,945,275 and Japanese laid open Application Sho No. 64-30477).

However, in the ultrsasonic driving motor, because the rotor is in contact with the electrodes on the piezoelectric vibrator by the pressure of a spring, the electrodes are worn in a short time by the rotor. Also, if the electrodes are protected from wear by mounting a cover on the electrodes, the rotor is worn by rotation thereof, the pressure between the piezoelectric vibrator and the rotor is changed and the ultrasonic driving motor does not have a long life.

SUMMARY OF THE INVENTION

It is, therefore, the primary object of the present invention to provide an ultrasonic driving motor comprising a rotor comprising a spring in itself.

It is another object of the present invention to provide an ultrasonic driving motor having minor wear of the rotor.

It is another object of the present invention he provide a thin ultrasonic driving device by using a thin piezoelectric vibrator.

In order to accomplish the above and other object, the present invention comprises a stator having a piezoelectric vibrator having a plurality of electrodes on both sides of the vibrator piezoelectric vibrator being fixed in a case and a rotor comprising a resilient split ring frame having a plurality of slide projections in contact with the edge face of the piezoelectric vibrator.

DESCRIPTION OF THE PREFERRED EMBODIMENTS

Figure 1:
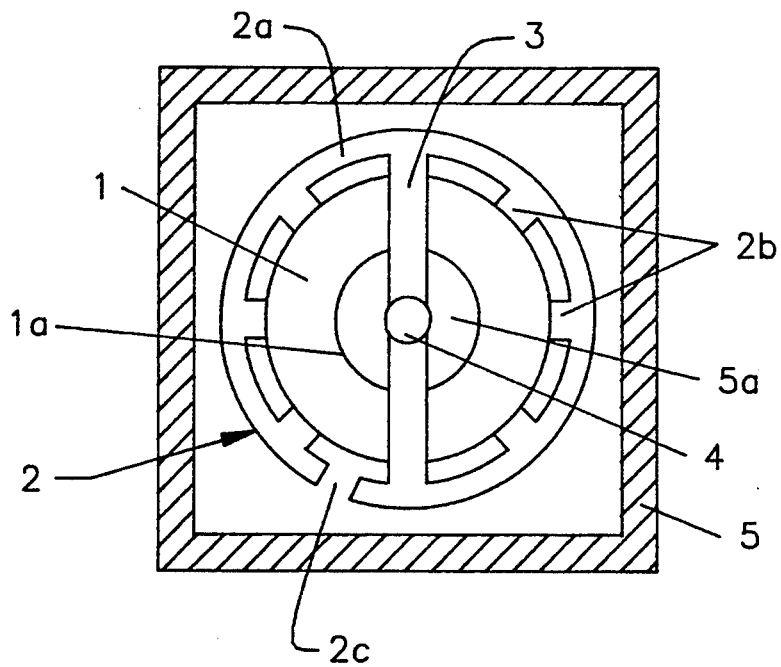
FIG. 1 shows a plane view of an ultrasonic driving motor of an embodiment of the present invention.
Figure 2:
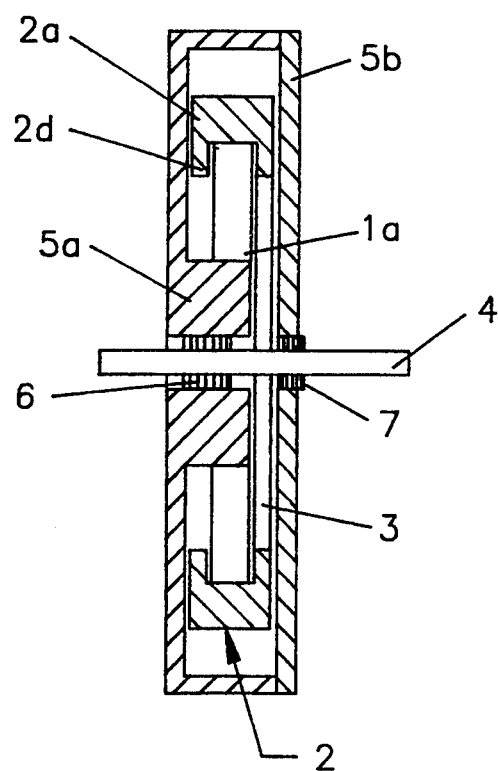
FIG. 2 shows a side sectional view of the ultrasonic driving motor in FIG. 1.

Referring to FIG. 1, a rotor 2 comprises resilient ring frame 2a having a plurality of projections 2b in the inside of the resilient ring frame 2a. One portion of the ring frame 2a is split and the ring frame 2a is mounted and pressed on the edge of a thin ring type piezoelectric vibrator 1 by opening the split portion 2c. Guides 2d are attached to the opposed slide projections 2b, because the slide projections 2b are not intended to slide off the thin ring type piezoelectric vibrator 1.

A supporting member 3 is attached to the opposed guides through about the center of the thin ring type piezoelectric vibrator 1 and a rotatable shaft 4 is fixed to the supporting member 3.

The ring type piezoelectric vibrator 1 is fixed in case 5 by inserting a projection 5a into the hole 1a of the piezoelectric vibrator 1 and the rotatable shaft 4 is supported to rotate by a bearing 6 arranged in to a center hole of the projection 5a of the case 5 and a bearing 7 arranged in to a case cover 5b in an opposed position to the bearing 6.

In the ultrasonic driving motor of the present embodiment, as shown in the above patent, when one of two electrodes formed on one side of the piezoelectric vibrator 1 and one of two electrodes formed on the other side of the piezoelectric vibrator 1 are connected to an AC power, a progressive wave progressing one way is generated on the edge portion and the side portions of the piezoelectric vibrator. When one of the two electrodes formed on the one side of the piezoelectric vibrator 1 and the other of the two electrodes formed on the other side of the piezoelectric vibrator 1 are connected to the AC power, a progressive wave progressing in an opposite direction is generated on the edge portion and the side portions of the piezoelectric vibrator. Accordingly, the rotor 2 is rotated in one direction or in the opposite direction by the progressive wave.

The ultrasonic driving motor of the present invention is very small and thin because the thickness of the ring type piezoelectric vibrator 1 is about 1 mm to 1.5 mm and can be used for controlling a volume of a sound apparatus and so on because the ultrasonic driving motor is instantaneously stopped when the power is cut.

Figure 3:
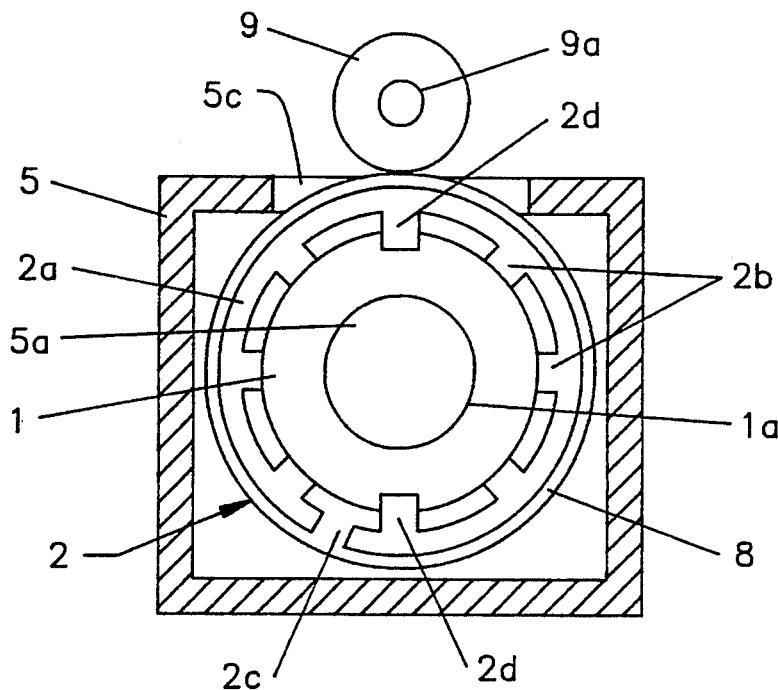
FIG. 3 shows a plane view of the ultrasonic driving motor in another embodiment according to the present invention.
Figure 4:
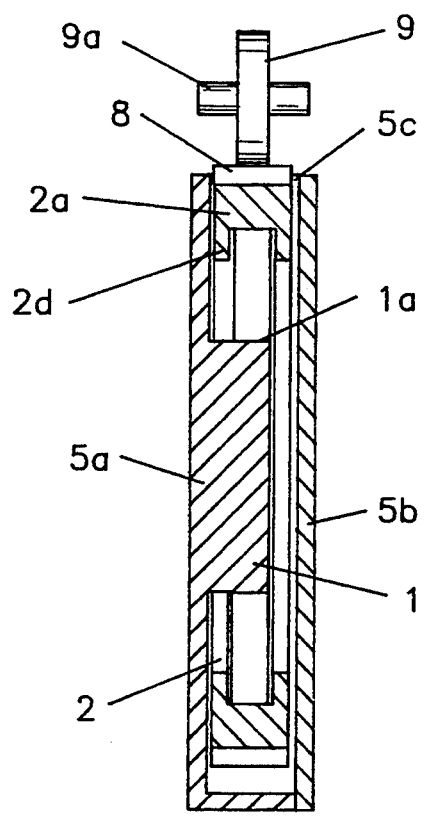
FIG. 4 shows a side sectional view of the ultrasonic driving motor in FIG. 3.

Referring to FIGS. 3 and 4, 1 designates a ring type piezoelectric vibrator, 2; a rotor, 5; a case and these components are the same as those of the above embodiment and are not explained. In this embodiment, a friction material 8 is attached to the ring frame 2a of the rotor 2, one portion of the ring frame 2a is projected from a hole 5c of the case 5 and the friction material 8 is in contact with a rotatable member 9 supported by a shaft 9a.

In the ultrasonic driving motor of the present embodiment, when the rotor 2 is rotated, the rotary member 9 in contact with the friction member 8 is rotated and rotary power is taken off the shaft 9a.

Figure 5:
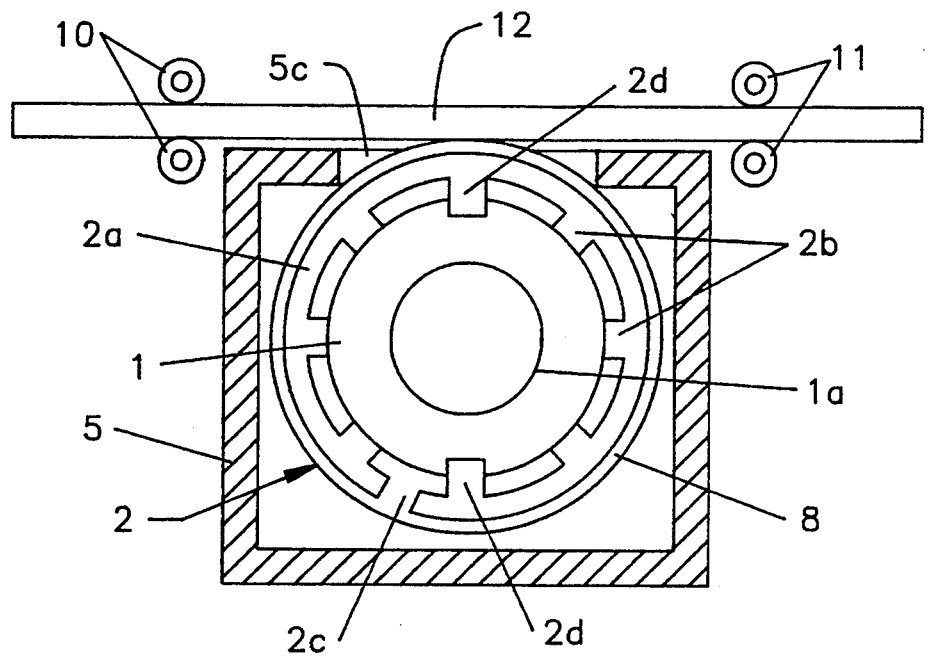
FIG. 5 shows a plane view in another embodiment according to the present invention.
Figure 6:
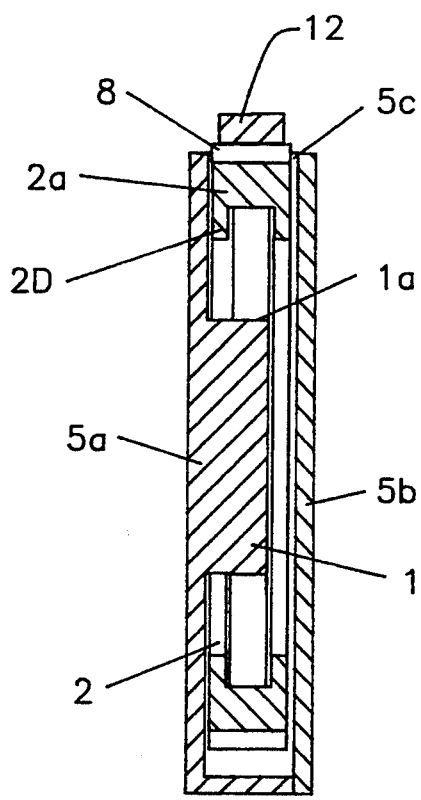
FIG. 6 shows a side sectional view of the ultrasonic driving motor in FIG. 5.

Referring to FIGS. 5 and 6, 1 designates a ring type piezoelectric vibrator, 2; a rotor, 5; a case, 8; a friction member and these components are the same as those of the above embodiments and are not explained. In this embodiment, one portion of the ring frame 2a is projected from a hole 5c of the case 5 and the friction material 8 is in contact with a linearly movable member 12 supported by supporting rollers 10 and 11.

In the ultrasonic driving motor of the present embodiment, when the rotor 2 is rotated, the moving member 12 in contact with the friction member 8 is linearly moved. Accordingly, a position control is performed by this ultrasonic driving motor.

Figure 7:
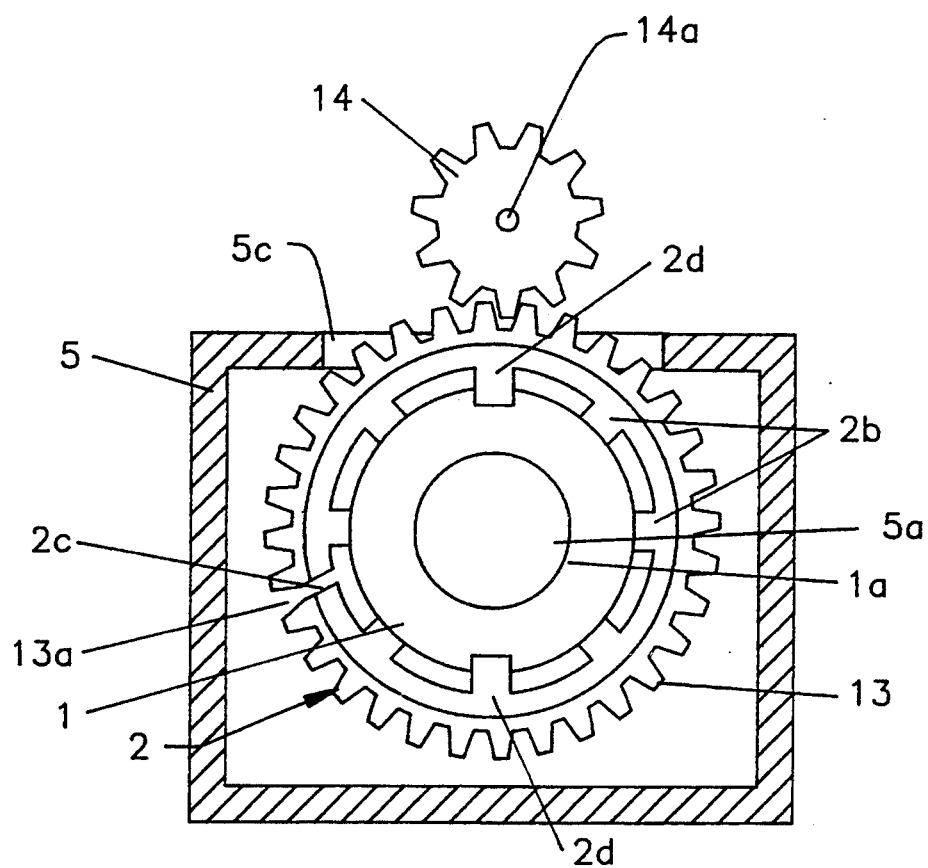
FIG. 7 shows a plane view in another embodiment according to the present invention.
Figure 8:
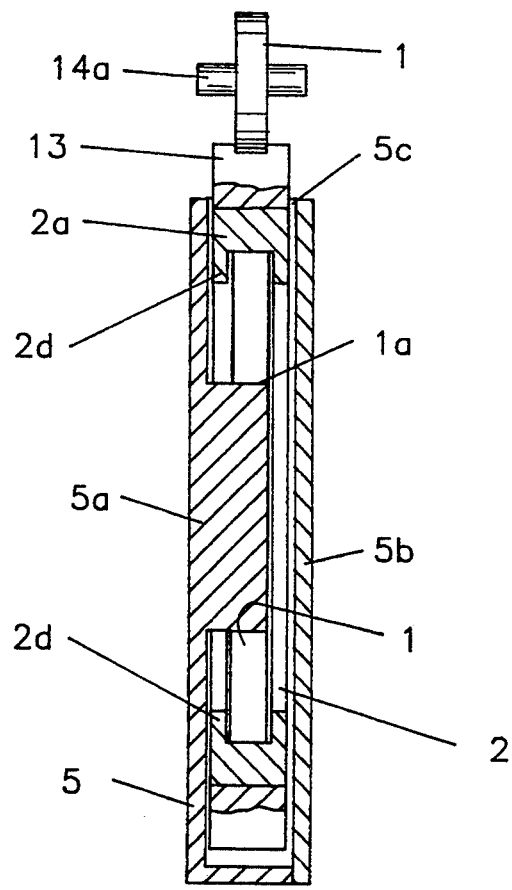
FIG. 8 shows a side sectional view of the ultrasonic driving motor in FIG. 7.

Referring to FIGS. 7 and 8, 1 designates a ring type piezoelectric vibrator, 2; a rotor, 5; a case and these components are the same as those of the above embodiments and are not explained. In this embodiment, a gear 13 is attached to the ring frame 2a and one portion of the gear 13 is projected from the hole 5c of the case 5. A separate portion 13a is formed on the gear 13 in the same position as the separated portion 2c of the ring frame 2a. One portion of the gear 13 is projected from the hole 5c of the case 5 and is engaged with a gear 14 supported by a shaft 14.

In the present embodiment, when the rotor 2 with the gear 13 is rotated, the gear 14 engaged with the gear 13 is rotated and the rotary power is taken off the shaft 14a.

In FIG. 7, the gear 13 attached to the ring frame 2a resilient. When the split in the separated portion 2c is small, the rotation of the gear 13 is near 360°.

Figure 9:
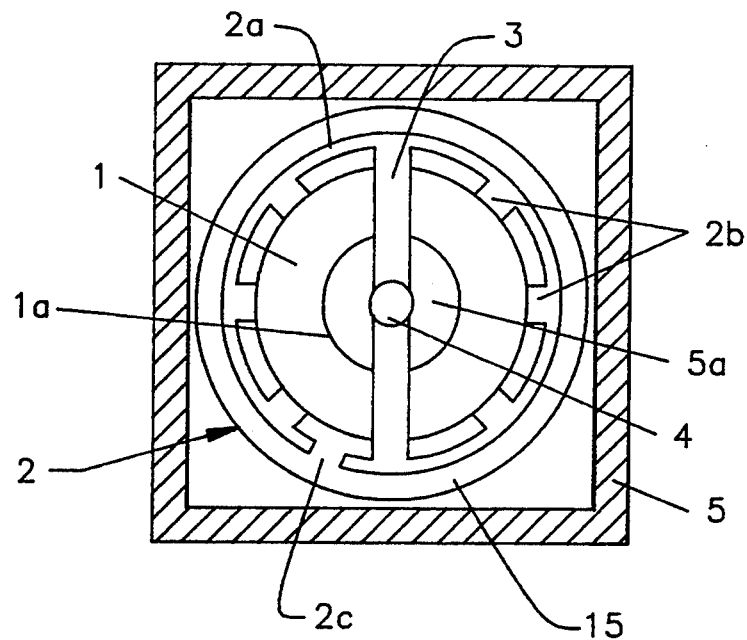
FIG. 9 shows a plane view in another embodiment according to the present invention.
Figure 10:
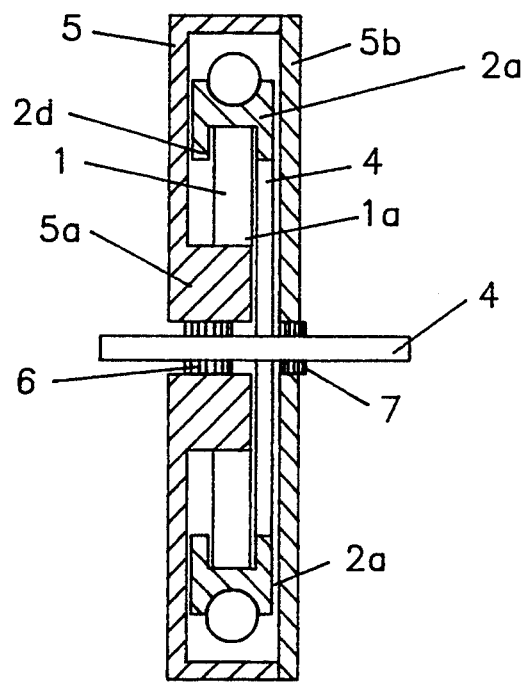
FIG. 10 shows a side sectional view of the ultrasonic driving motor in FIG. 9.

Referring to FIGS. 9 and 10, 1 designates a ring type piezoelectric vibrator, 2; a rotor, 2a; a ring frame, 2b; slide projections, 2c; a separated portion, 2d; guides, 3; a supporting member, 4; a rotary shaft, 5; a case, 5a; a projection; 5b; a case cover and these compositions are same as those of FIG. 1 and are not explained. In the present embodiment, resilient member 15 such as a rubber ring is mounted on the periphery of the ring frame 2a to compress the ring frame 2a.

In the present embodiment, when the rotor 2 is rotated, rotary power is taken out of the rotary shaft 4.

Figure 11:
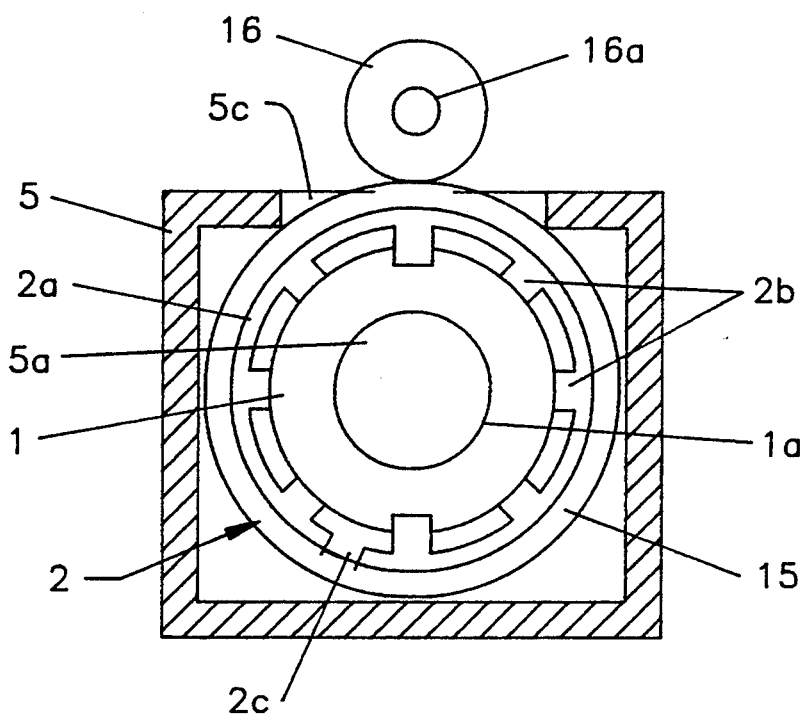
FIG. 11 shows a plane view in another embodiment according to the present invention.
Figure 12:
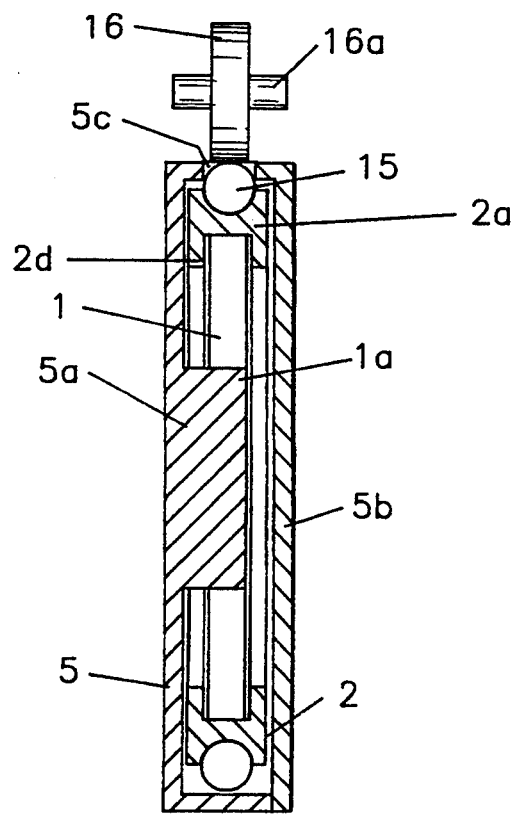
FIG. 12 shows a side sectional view of the ultrasonic driving motor in FIG. 11.

Referring to FIGS. 11 and 12, 1 designates a ring type piezoelectric vibrator, 2; a rotor, 2a; a ring frame, 2b; slide projections, 2c; a separated portion, 2d; guides; 5; a case, 5a; a projection; 5b; a case cover, 15; a rubber ring and these components are the same as those of FIG. 9 and are not explained. In the present embodiment, one portion of the rubber ring 15 is projected from a hole 5c of the case 5 and the rotary member 16 supported by the rotary shaft 16a is contacted with the rubber ring 15.

In the ultrasonic driving motor of this embodiment, when the rotor 2 with the rubber ring 15 is rotated, the rotary member 16 in contact with the rubber ring 15 is rotated and the rotary power is taken out of the rotary shaft 16a.

Figure 13:
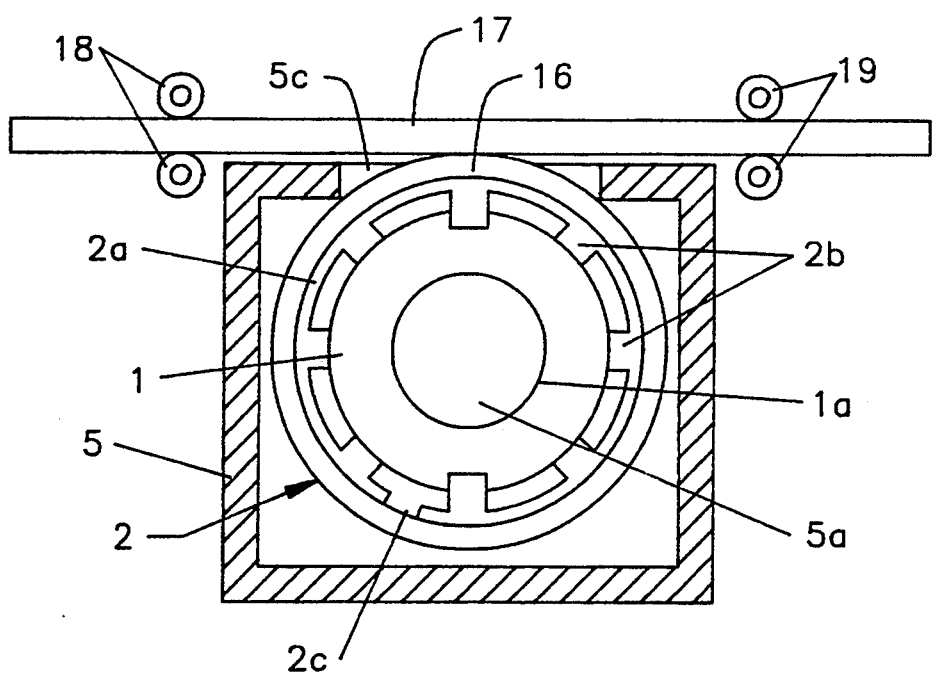
FIG. 13 shows a plane view in another embodiment according to the present invention.
Figure 14:
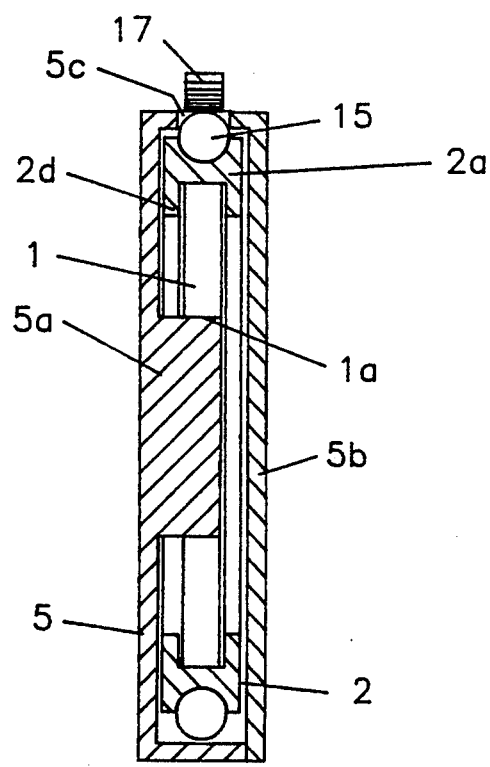
FIG. 14 shows a side sectional view of the ultrasonic driving motor in FIG. 12.

Referring to FIGS. 13 and 14, 1 designates a ring type piezoelectric vibrator, 2; a rotor, 2a; a ring frame, 2b; slide projections, 2c; a separated portion, 2d; guides, 5 a case, 5a; a projection; 5b; a case cover, 15; a rubber ring and these components are the same as those of FIG. 12 and are not explained. In the present embodiment, one portion of the rubber ring 15 projects from the hole 5c of the case 5 and the moving member 17 supported by the supporting rollers 18 and 19 is contact with the rubber ring 15.

In the ultrasonic driving motor of this embodiment, when the rotor 2 with the rubber ring 15 is rotated, the moving member 17 is linearly moved by the rotation of the rotor 2. Accordingly, a positioning control can be performed by the moving member 17.

Figure 15:
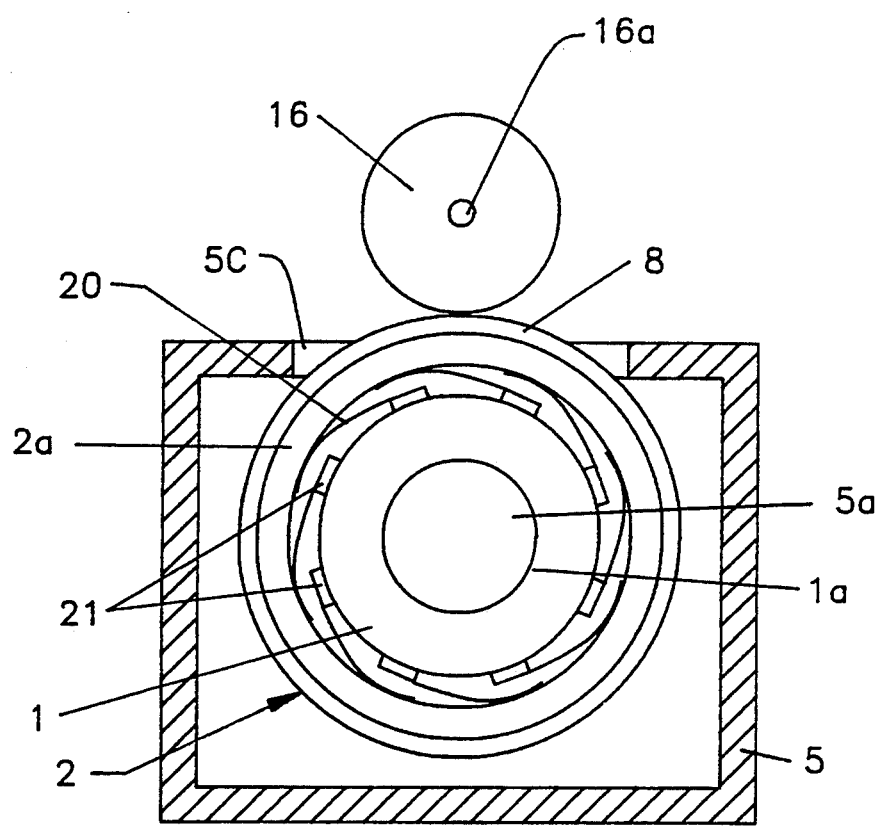
FIG. 15 shows a plane view of another embodiment according to the present invention.
Figure 16:
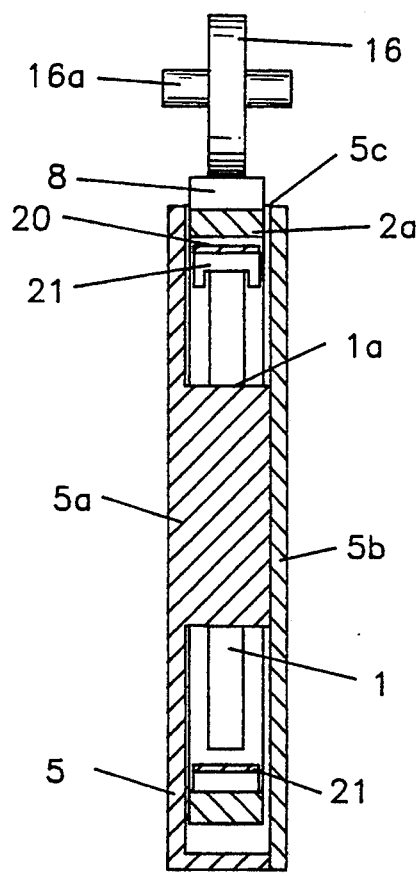
FIG. 16 shows a side sectional view of the ultrasonic driving motor in FIG. 15.

Referring to FIGS. 15 and 16, 1 designates a ring type piezoelectric vibrator, 2; a rotor, 2a; a ring frame, 5; a case, 5a; a projection; 5b; a case cover, 8; a friction member, 16; a rotary member, 16a; a rotary shaft. These components are the same as those of FIG. 13 and are not explained. In the present embodiment, one end of a plurality of leaf springs 20 is attached to the ring frame 2a, the other ends of the leaf springs 20 are attached to a plurality of slide members 21 and the slide members 21 are in contact with the edge face of the piezoelectric vibrator. The friction member 8 is attached to the ring frame 2a and one portion of the friction member 8 is projected from the hole 5c of the case 5 and is in contact with the rotary member 16 supported by the rotary shaft 16a.

In the ultrasonic driving member of the present embodiment, when AC power is supplied to the ring type piezoelectric vibrator 1, the slide members 21 of the rotor 2 are moved on the edge of the piezoelectric vibrator 1. The rotor 2 with the friction member 8 is rotated and the rotary member 16 in contact with the friction member is rotated. Therefore, the rotary power is taken out of the rotary shaft 16a.

Figure 17:
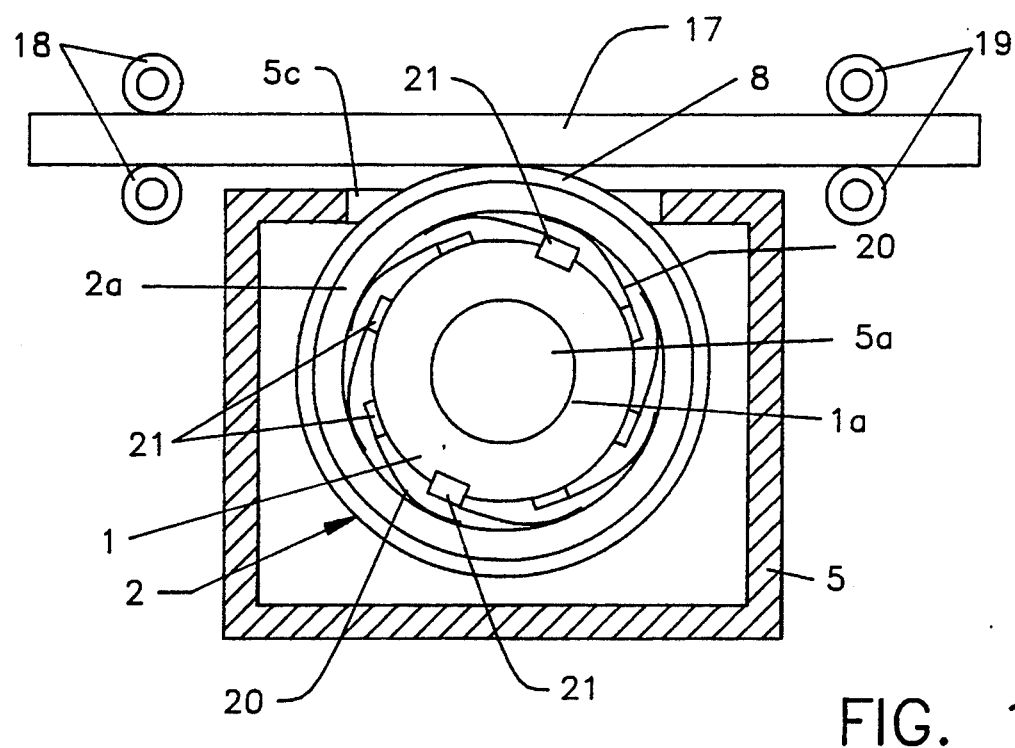
FIG. 17 shows a plane view of another embodiment according to the present invention.
Figure 18:
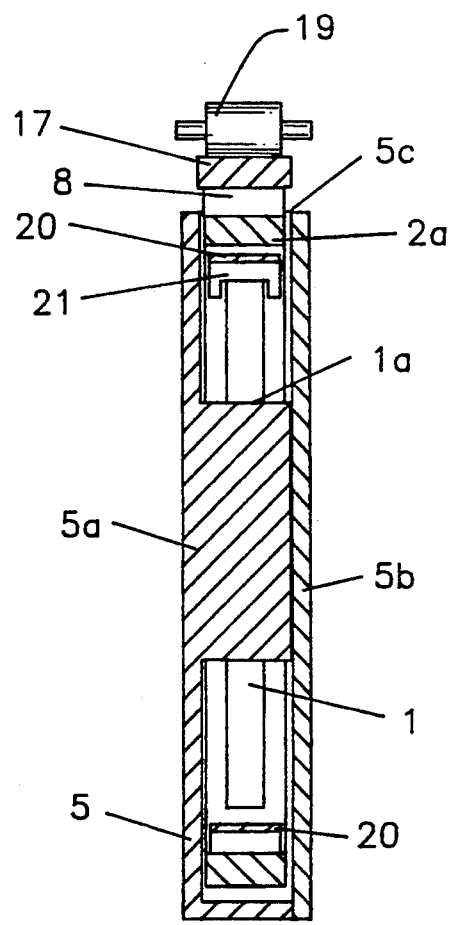
FIG. 18 shows a side sectional view of the ultrasonic driving motor in FIG. 17.

Referring to FIGS. 17 and 18, 1 designates a ring type piezoelectric vibrator, 2; a rotor, 2a; a ring frame, 5; a case, 5a; a projection; 5b; a case cover, 8; a friction member, 20; leaf spring, 21; slide members. These components are the same as those by FIG. 16 and are not explained. In the present embodiment, one portion of the friction member 8 is projected from the hole 5c of the case 5 and is in contact with the moving member 17 supported by the supporting rollers 18 and 19.

In the ultrasonic driving motor in this embodiment, when the rotor 2 is rotated, the moving member 17 in contact with the friction member 8 is linearly moved by rotation of the rotor 2. Accordingly, a positioning control is performed by the moving member 17.

Figure 19:
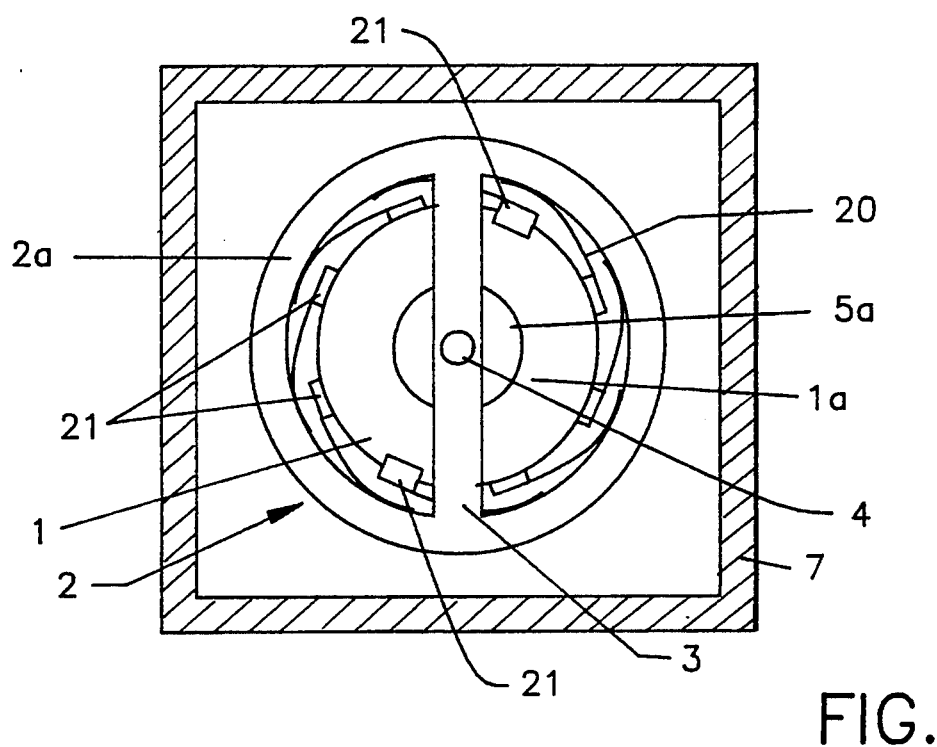
FIG. 19 shows a plane view of another embodiment according to the present invention.
Figure 20:
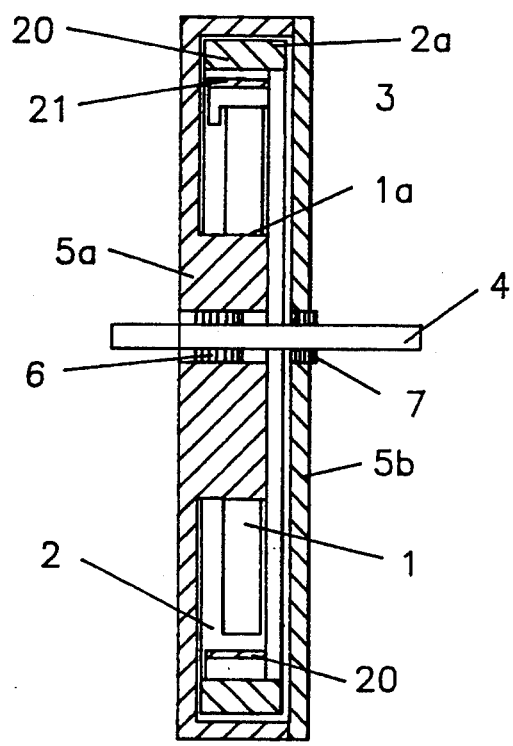
FIG. 20 shows a side sectional view of the ultrasonic driving motor in FIG. 19.

Referring to FIGS. 19 and 20, 1 designates a ring type piezoelectric vibrator, 2; a rotor, 2a; a ring frame, 5; a case, 5a; a projection; 5b; a case cover, 20; leaf springs, and 21 are slide members. These components are the same as those of the above embodiment and are not explained. In the present embodiment, bearings 6 and 7 are arranged in the case 5 and case cover 5b, the rotary shaft 4 is supported by the bearings 6 and 7 and the rotary shaft 4 is fixed to the supporting member 3, both ends of supporting members are fixed to the ring frame 2a.

In the ultrasonic driving motor in this present embodiment, when the rotor 2 is rotated, the rotary shaft 4 is rotated and the rotary power is taken out of the rotary shaft 4.

Figure 21:
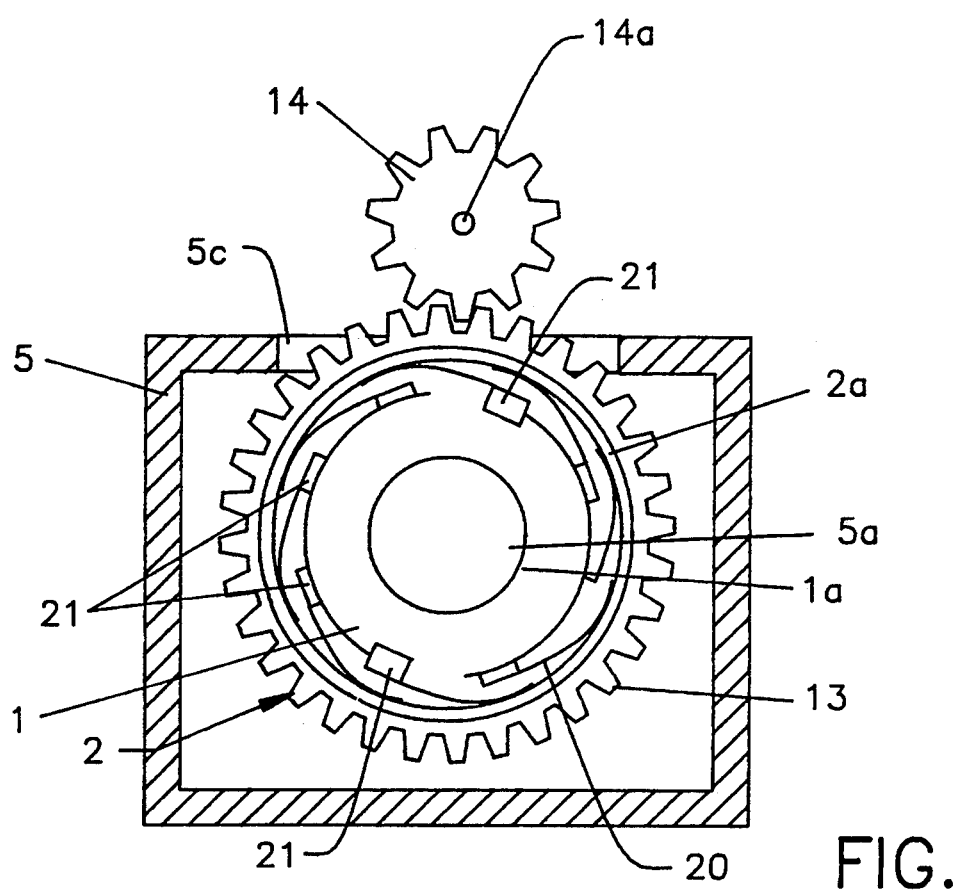
FIG. 21 shows a plane view of another embodiment according to the present invention.
Figure 22:
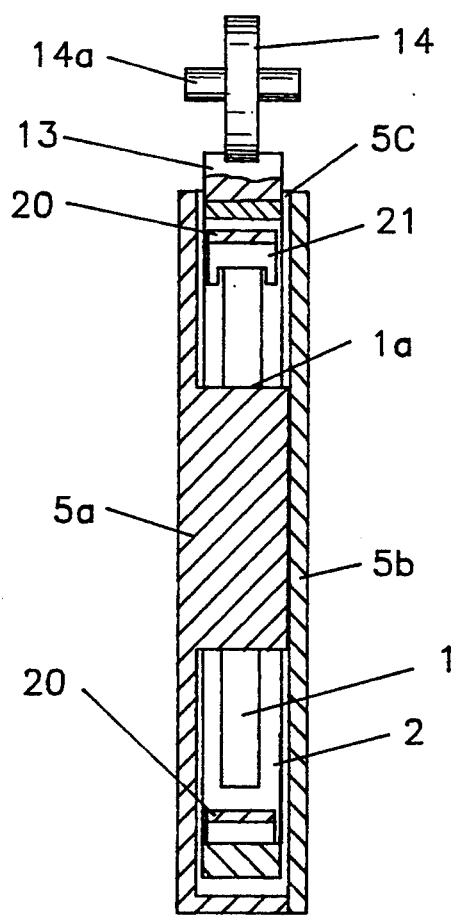
FIG. 22 shows a side sectional view of the ultrasonic driving motor in FIG. 21.

Referring to FIGS. 21 and 22, 1 designates a ring type piezoelectric vibrator; 2, a rotor; 2a, a ring frame; 5, a case; 5a, a projection; 5b, a case cover; 20, leaf springs; 21, slide members. These components are same as those of the above embodiment and are not explained. In the present embodiment, a gear 13 is fixed to the rotor 2, one portion of the gear 13 projects from a hole 5c of the case 5 and a gear 14 supported by the rotary shaft 14a is engaged with the gear 13.

In the ultrasonic driving motor of this embodiment, when the rotor 2 with the gear 13 is rotated, the gear 14 engaged with the bear 13 is rotated. Therefore, rotary power is taken out of the rotary shaft 14a.

The ultrasonic driving motor of the invention is very thin and compact because the thickness of the ring piezoelectric vibrator 1 is about 1 mm to 1.5 mm. Also, the ultrasonic driving motor of the present invention stops when the AC power is discontinued. Accordingly the ultrasonic driving motor does not require a brake and can be used as a control for a sound apparatus.

The ring frame 2a is made from a metal or a plastic (e.g. nylon).

What is claimed is:

1. An ultrasonic driving motor comprising:

a stator comprising a piezoelectric vibrator having a circular portion with an edge face and said plurality of electrodes arranged at on each side, the piezoelectric vibrator being fixedly arranged in a case;

and a rotor comprising a resilient split ring frame arranged in contact with the circular portion of the stator, through a plurality of sliding projections held in contact with the edge face of the piezoelectric vibrator by the resilience of the split ring frame.

2. An ultrasonic driving motor of claim 1 wherein a supporting member is fixed to the split ring frame and a shaft is fixed to said supporting member wherein the shaft rotates as the motor rotates.

3. An ultrasonic driving motor of claim 1 wherein a friction member is arranged on the periphery of the ring frame and the friction member is in contact with a rotatable member having a shaft and rotary power is taken off the shaft of said rotatable member.

4. An ultrasonic driving motor of claim 1 wherein a friction member is arranged on the periphery of the ring frame and the friction member is in contact with a linearly movable member wherein the linearly movable member is moved by rotation of the ring frame.

5. An ultrasonic driving motor of claim 1 wherein a first gear is arranged on the periphery of the ring frame and the first gear engages a rotatable second gear having a shaft and power is taken off the shaft of the second gear.

6. An ultrasonic driving motor comprising:

a stator comprising a piezoelectric vibrator having sides and a circular portion with an outer edge face and a plurality of electrodes on each side of the vibrator, the piezoelectric vibrator being fixed in a case;

a rotor comprising a resilient split ring frame having an inner and an outer periphery, arranged in contact with the outer edge face of the stator through a plurality of slide projections arranged on the inner periphery in contact with the edge face of the piezoelectric vibrator;

and a resilient ring member arranged for applying pressure on the outer periphery of the ring frame.

7. An ultrasonic driving motor of claim 6 wherein a supporting member is fixed to the ring frame and a shaft is fixed to the supporting member.

8. An ultrasonic driving motor of claim 6 wherein the resilient ring member is in contact with a rotatable member having a shaft and rotary power is taken off the shaft of the rotatable member.

9. An ultrasonic driving motor of claim 6 wherein the resilient ring member is in contact with a linearly movable member and the movable member is linearly moved by rotation of the ring frame.

10. An ultrasonic driving motor comprising:

a stator comprising a piezoelectric vibrator having sides and a circular portion with an edge face and a plurality of electrodes on each side, the piezoelectric vibrator being fixedly arranged in a case; and a rotor comprising a ring frame having a plurality of sliding projections, the sliding projections comprising a plurality of leaf springs having first ends fixedly arranged on the ring frame and second ends fixedly attached to sliding members in contact with the edge face of the piezoelectric vibrator the sliding members being held in contact with the edge face of the stator by the resilience of the leaf springs.

11. An ultrasonic driving motor of claim 10 wherein a supporting member is fixed to the ring frame and a shaft is fixed to the supporting member.

12. An ultrasonic driving motor of claim 1 wherein a friction member is attached to a periphery of the ring frame and is in contact with a rotatable member and rotary power is taken off a rotatable shaft of the rotatable member.

13. An ultrasonic driving motor of claim 1 wherein a friction member is attached to the periphery of the ring frame and the friction member is in contact with a linearly movable member and the linearly movable member is moved by rotation of the ring frame.

14. An ultrasonic driving motor of claim 6 wherein the resilient ring comprises a rubber ring.

15. An ultrasonic driving motor of claim 8 wherein the resilient ring comprises a rubber ring.

16. An ultrasonic driving motor of claim 9 wherein the resilient ring is a rubber ring.

17. An ultrasonic driving motor of claim 10 wherein the first ends of the leaf spring is attached to an inner periphery of the rotor and the sliding members are in contact with an outer edge of face of the circular portion.

* * * * *